Dec. 11, 1956  R. ANTONSEN  2,773,744
CONTINUOUS THERMAL PROCESS OF MAKING CARBON BLACK
Filed March 28, 1952
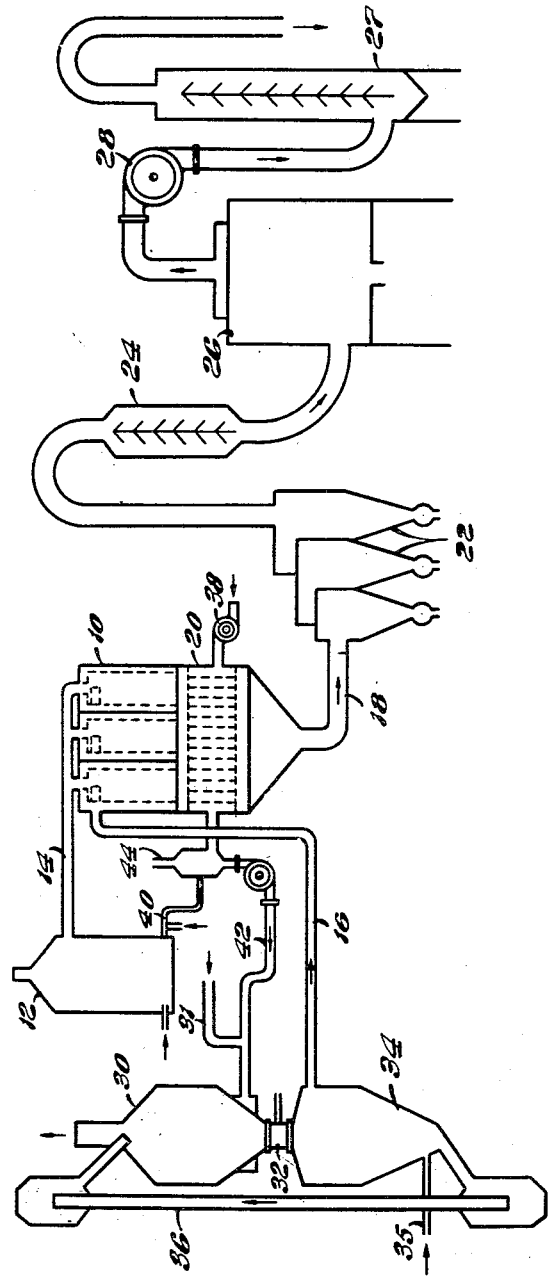
INVENTOR.
Randolph Antonsen
BY
Kenway, Jenney, Witter & Hildreth
Att'ys.

United States Patent Office 2,773,744
Patented Dec. 11, 1956

2,773,744

CONTINUOUS THERMAL PROCESS OF MAKING CARBON BLACK

Randolph Antonsen, Boston, Mass., assignor to Godfrey L. Cabot, Inc., Boston, Mass., a corporation of Massachusetts Application March 28, 1952, Serial No. 279,046

5 Claims. (Cl. 23—209.4)

This invention relates to the production of carbon black by thermal dissociation of a hydrocarbon in an atmosphere of heated gas which is substantially inert with respect to the hydrocarbon.

In thermal processes heretofore known a hydrocarbon raw material, commonly referred to as "make gas," is introduced into a reactor containing refractory checker brick, having a large total surface area, previously heated to well above reaction temperature. Make gas, with or without diluent gases admixed therewith, is flowed into the reactor until the temperature therein falls below the minimum for effective dissociation of the gas. At that point make gas flow is stopped and the refractory is reheated.

Such conventional processes are inefficient because they are cyclic and, most importantly, because the greater proportion of carbon dissociated from the make gas adheres to the refractory brick and is lost by burning in the heating cycle. Thus recovery of carbon black from such processes cannot approach the initial carbon content of the make gas.

The process of this invention, on the other hand, being carried out in a gaseous atmosphere, is free from the disadvantages of the conventional processes. For one thing, it is continuous and does not require alternating heat and make cycles nor duplicate reactors to provide continuous production. For another, very little carbon will be lost by deposition upon surfaces within the reactor as refractory checker brick is not required. Consequently, practically the entire carbon content of the make hydrocarbon is recoverable. Furthermore, since the interior of the reactor contains no checker brick it is possible to use a much smaller reactor than that required for conventional processes, or, conversely a much higher throughput of raw material is possible in a reactor of comparable size.

In carrying out the process of my invention make hydrocarbon in the gaseous state and preferably preheated is introduced into an unobstructed, heat insulated reaction zone into which a gas which is inert with respect to the make gas and which is advantageously hydrogen, heated to above the dissociation temperature of the make gas, is simultaneously introduced from an external source. Dissociation of the make gas is effected by heat transfer from the inert gas to produce carbon black and hydrogen. The product gases are then cooled and passed through suitable collection equipment in which the carbon black is recovered. A portion of the gas is reheated and returned to the reactor while the remainder is recovered for other use.

It is the principal object of my invention to provide a continuous process for the production of carbon black by thermal dissociation of a hydrocarbon in an atmosphere of hot gas inert with respect to the hydrocarbon make material.

It is a further object of my invention to provide a process in which carbon black can be produced by thermal dissociation of a hydrocarbon in an unobstructed reaction chamber that is free of checker brick work.

These and the other objects of my invention will best be understood and appreciated from the following description of an illustrative manner of carrying out the process in connection with the accompanying diagrammatic drawing of apparatus which may advantageously be employed for that purpose.

The apparatus includes in its organization a reactor which may be a single heat-insulated cylindrical chamber 10 or may be compartmented as shown to provide a plurality of unobstructed reaction zones. A preheater 12 is connected to the chamber 10 by a duct 14 and through this continuously flows make hydrocarbon gas. This may be natural gas of low L. P. G. content preheated to about 1800° F. Inert gas, heated to a temperature above the dissociation temperature of the make gas, is introduced continuously into the chamber 10 through a duct 16 leading to the top of the chamber. The conduits 14 and 16 are preferably connected into the chamber 10 in such a manner as to insure maximum mixing of the make gas and the inert heating gas, as by introducing them tangentially and in countercurrent flow.

The make gas will ordinarily be natural gas but other hydrocarbon gases or liquid vapors may be used as make material in the process of my invention. The make gas may be introduced undiluted or, in order to vary the quality of carbon black being produced, may have an inert gas mixed with it.

Dissociation of the make gas to carbon and hydrogen occurs very rapidly. The size of the carbon black particles is large as compared with blacks produced by the furnace and channel processes. Particle size can be somewhat reduced by diluting the make gas with hydrogen or other inert gas. In any event the volume of gas in reactor 10 will be relatively large as compared with the volume of carbon black produced.

After the dissociation step has taken place, the gases, consisting principally of hydrogen, with their suspended carbon black content pass to a water quench section 18 where they are cooled. A recuperator 20 may be provided at the outlet end of reactor 10 as illustrated if desired but its use is optional.

After leaving cooling section 18 the gases pass to any suitable collecting equipment. As here illustrated several conventional cyclone separators 22 arranged in series are provided to separate the bulk of the carbon black from the gases. Thereafter the gases may be further cooled in a second water quench section 24 and then passed through a bag filter 26 where the residual black is removed. The clean gases are then sent through a third cooler 27 to storage and ultimate use. A fan 28 is herein shown as being located in the outlet duct leading from the filter unit 26 and this serves to maintain proper flow conditions of the gases.

The efficiency of the dissociation reaction will depend to some extent upon the temperature prevailing within reactor 10. Consequently, it is desirable to introduce the inert gas, which will be referred to hereinafter as hydrogen, into the reactor at the highest temperature obtainable and which the equipment can satisfactorily withstand. The gas may be heated by any suitable means external to the reaction zone. As here shown, the apparatus includes for this purpose a more or less conventional pebble heater in which the refractory pellets are heated in an upper chamber 30 by the combustion of fuel introduced through pipe 31 and pass through a conventional steam seal 32 into the lower contact chamber 34. Hydrogen is introduced into the bottom of contact chamber 34 through pipe 35 where it is heated by passing over the hot pebbles. The hot gas then flows through conduit 16, preferably insulated to minimize heat loss, into reactor 10. The pebbles used to heat the hydrogen are then recycled by any convenient means, such as bucket elevator 36, or by other suitable means such as a dense phase fluid transfer device, to the pebble heating chamber 30. This chamber may be heated by any suitable fuel, hydrogen from the process being one such.

When recuperator 20 is included in the apparatus it may be advantageously used to preheat air for combustion of heating fuel in pebble heater 30 and make gas preheater 12. Thus, air forced through recuperator 20 by an air blower 38 will pass to the gas preheater 12 through a conduit 40 and to pebble heater 30 through a conduit 42. Excess air may be released through pipe 44.

Inasmuch as the quality of the carbon black product is determined by the speed of dissociation of the make gas and by the amount of diluent gas present it is evident that almost every type of carbon black can be produced by the process of my invention. For example, to produce a small particle size black a large excess over the theoretical amount necessary of hydrogen heated to the maximum possible temperature will be introduced into the reactor simultaneously with the make gas under conditions promoting maximum turbulence and the gases will be flowed rapidly through the reactor. Or to produce a large particle size black only the theoretical amount of hydrogen necessary for complete dissociation will be introduced with the make gas, both gases being introduced with a minimum of turbulence and flowed through the reactor relatively slowly. Likewise, to produce a black having a high extract content a theoretical equivalent of hydrogen and make gas will be flowed rapidly through the reactor whereby some cracked hydrocarbon will remain on the black. The possible variations in operating conditions are legion.

In the following example are set forth the conditions of temperature and volume of hydrogen required for theoretically complete dissociation of the make gas to carbon and hydrogen. As will be noted the temperatures and volumes of hydrogen in themselves have an effect upon the quality of the product irrespective of the flow conditions discussed above.

*Example*

| Make Gas Preheat, °F. | Temp. of $H_2$ (°F.) | Volume of $H_2$ @ 60° F., 760 mm Hg required per MCF. of Make Gas | Black Quality |
|---|---|---|---|
| 1,600 | 3,000 | 7,940 | Coarse. |
| 1,500 | 3,000 | 6,200 | Do. |
| 1,800 | 3,000 | 5,450 | Do. |
| 1,600 | 3,500 | 3,850 | Very coarse. |
| 1,500 | 3,500 | 4,030 | Do. |
| 1,800 | 3,500 | 3,600 | Do. |
| 1,600 | 3,000 | 11,500 | Fine. |
| 1,500 | 3,000 | 12,000 | Very Fine. |
| 1,800 | 3,000 | 10,800 | Fine. |
| 1,600 | 3,500 | 6,180 | Medium. |
| 1,500 | 3,500 | 6,440 | Do. |
| 1,800 | 3,500 | 5,730 | Do. |
| 1,600 | 3,000 | 9,350 | Fine. |
| 1,600 | 3,500 | 5,690 | Medium. |
| 1,600 | 4,000 | 4,540 | Coarse. |
| 1,600 | 4,500 | 3,150 | Do. |
| 1,800 | 3,000 | 8,650 | Medium. |

Having thus disclosed my invention and described in detail illustrative features and characteristics thereof, I claim as new and desire to secure by Letters Patent:

1. A process for producing carbon black and gases composed substantially of hydrogen which comprises the steps of continuously flowing into an unobstructed heat-insulated reaction zone a stream of hydrocarbon gas, heating outside the reaction zone and without dilution an essentially hydrogen gas previously produced in the process to above dissociation temperature of the hydrocarbon gas, flowing the hot hydrogen gas into the reaction zone, thermally dissociating the hydrocarbon gas to carbon black and hydrogen by heat transfer from the hot hydrogen gas, separating the carbon black from said gases produced into the dissociation reaction, externally heating a portion of said thus obtained gases to hydrocarbon dissociation temperature, and recycling said gases to the reaction zone for reaction with additional hydrocarbon gas.

2. The process of claim 1 in which the hydrogen gas is substantially hydrogen produced in the process and inert with respect to the hydrocarbon gas.

3. The process of claim 1 in which the hydrocarbon gas is preheated and the hydrogen gas is heated to a temperature above 2400° F. upon introduction into the reaction zone.

4. The process of claim 1 in which the hydrogen and make gases are introduced into the reaction zone in countercurrent flow.

5. The process of claim 1 in which a portion of the hydrogen-rich gases from the process is utilized to preheat the hydrocarbon gas and to heat the hydrogen gas.

References Cited in the file of this patent

UNITED STATES PATENTS

| | | |
|---|---|---|
| Re. 22,886 | Ayers | June 3, 1947 |
| 1,448,655 | Darrah | Mar. 13, 1923 |
| 1,844,327 | Lyder | Feb. 9, 1932 |
| 1,902,797 | Burke | Mar. 21, 1933 |
| 1,909,163 | Brownlee | May 16, 1933 |
| 1,925,130 | Brownlee | Sept. 5, 1933 |
| 1,987,643 | Spear et al. | Jan. 15, 1935 |
| 2,106,137 | Reed | Jan. 18, 1938 |
| 2,128,440 | Von Szesvich | Aug. 30, 1938 |
| 2,261,319 | Wilcox | Nov. 4, 1941 |
| 2,346,754 | Hemminger | Apr. 18, 1944 |
| 2,368,828 | Hanson et al. | Feb. 6, 1945 |
| 2,440,423 | Wiegand et al. | Apr. 27, 1948 |
| 2,564,700 | Krejci | Aug. 21, 1951 |
| 2,564,736 | Stokes | Aug. 21, 1951 |
| 2,587,107 | Cade | Feb. 26, 1952 |
| 2,597,233 | Ekholm et al. | May 20, 1952 |
| 2,623,811 | Williams | Dec. 30, 1952 |
| 2,625,466 | Williams | Jan. 13, 1953 |